United States Patent
Baranowski et al.

(10) Patent No.: US 11,230,041 B2
(45) Date of Patent: Jan. 25, 2022

(54) APPARATUS AND METHOD FOR PRODUCING A FIBER-REINFORCED INJECTION MOLDED COMPONENT

(71) Applicant: Ford Global Technologies, LLC, Dearborn, MI (US)

(72) Inventors: Thomas Baranowski, Wurselen (DE); Maik Broda, Wurselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 16/267,551

(22) Filed: Feb. 5, 2019

(65) Prior Publication Data
US 2019/0240885 A1 Aug. 8, 2019

(30) Foreign Application Priority Data
Feb. 7, 2018 (DE) .......................... 102018201904.5

(51) Int. Cl.
*B29C 45/18* (2006.01)
*B29C 70/00* (2006.01)
(Continued)

(52) U.S. Cl.
CPC .......... *B29C 45/18* (2013.01); *B29C 45/0005* (2013.01); *B29C 45/07* (2013.01);
(Continued)

(58) Field of Classification Search
CPC .............. B29C 45/18; B29C 45/14016; B29C 45/0005; B29C 45/07; B29C 45/06;
(Continued)

(56) References Cited

U.S. PATENT DOCUMENTS 6,207,090 B1  3/2001 Knisely et al.
6,270,332 B1 * 8/2001 Huggins ........... B29C 45/14008
                                                         425/127
(Continued)

FOREIGN PATENT DOCUMENTS

DE      4227729        2/1994
GB      2353246 A  *  2/2001  ....... B29C 45/14221
WO      2014076061    5/2014

OTHER PUBLICATIONS

Johnston, N.J., et al., Automated Fabrication of High Performance Composites: An Overview of Research at the Langley Research Center.

*Primary Examiner* — Jacob T Minskey
*Assistant Examiner* — S. Behrooz Ghorishi
(74) *Attorney, Agent, or Firm* — Burris Law, PLLC

(57) ABSTRACT

An apparatus for producing a fiber-reinforced injection molded component includes an injection mold half with a mold cavity and a receiving chamber open to the mold cavity. A band section of a fiber-reinforced plastics band is fed into the receiving chamber through a feed channel and a first clamping device arranged in an initial region of the receiving chamber and a second clamping device arranged in an end region of the receiving chamber clamp the fiber-reinforced plastics band section within the receiving chamber. A first cut-through device arranged in the initial region of the receiving chamber and a second cut-through device arranged in the end region of the receiving chamber cut the band section such that an injection molded component formed in the cavity of the mold includes the cut fiber-reinforced plastics band section and a fiber-reinforced injection molded component is provided.

11 Claims, 7 Drawing Sheets

Figure 1:
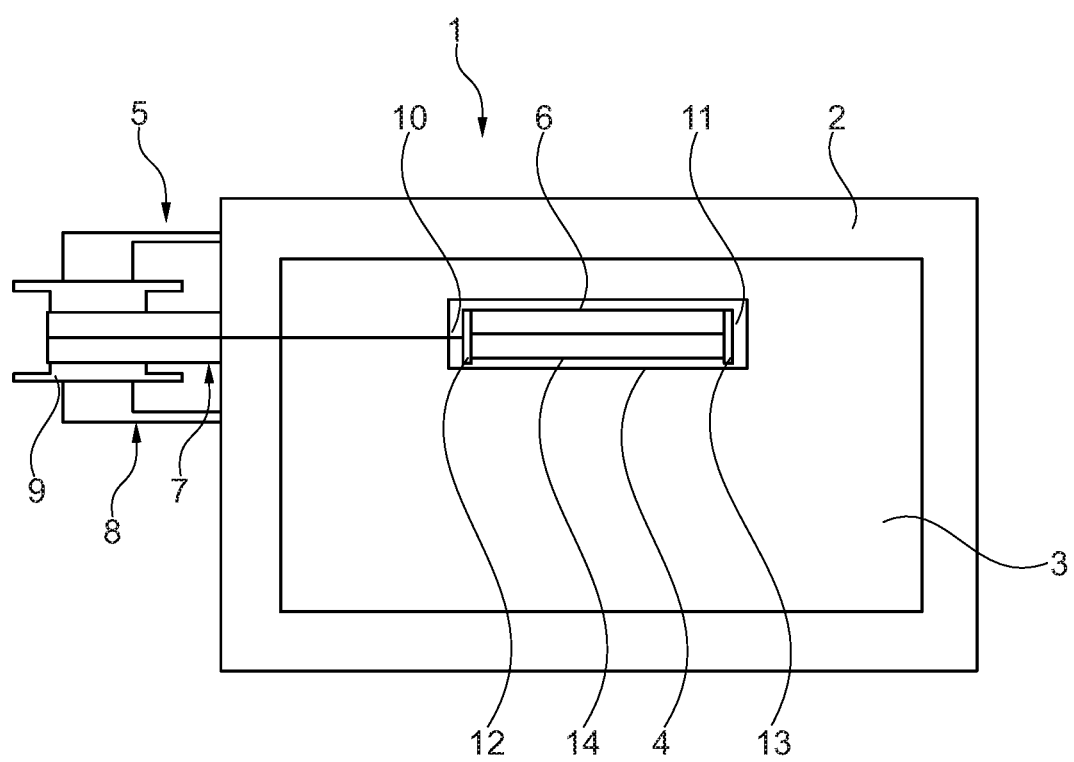

(51) Int. Cl.
*B29C 45/14* (2006.01)
*B29C 45/00* (2006.01)
*B29C 45/07* (2006.01)
*B29C 45/13* (2006.01)
*B29C 45/76* (2006.01)
*B29K 105/10* (2006.01)
*B29C 45/04* (2006.01)

(52) U.S. Cl.
CPC ........ *B29C 45/13* (2013.01); *B29C 45/14016* (2013.01); *B29C 45/762* (2013.01); *B29C 70/00* (2013.01); *B29C 45/0441* (2013.01); *B29K 2105/10* (2013.01)

(58) Field of Classification Search
CPC ... B29C 45/13; B29C 45/762; B29C 45/0441; B29C 45/14065; B29C 45/14786; B29C 45/2681; B29C 45/14221; B29C 45/14; B29C 45/1671; B29C 45/14008; B29C 45/14827; B29C 45/14262; B29C 45/14024; B29C 45/14032; B29C 2045/1404; B29C 2045/14049; B29C 2045/14057; B29C 2045/14098; B29C 2045/14188; B29C 45/14819; B29C 70/00; B29C 70/48; B29C 70/523; B29C 70/382; B29C 70/386; B29K 2105/10
See application file for complete search history.

(56) References Cited

U.S. PATENT DOCUMENTS

| | | | |
|---|---|---|---|
| 7,374,710 | B2 | 5/2008 | Ito et al. |
| 8,128,358 | B2 | 3/2012 | McLennan |
| 2005/0258559 | A1 | 11/2005 | Johansen et al. |
| 2007/0194489 | A1 | 8/2007 | Shimoyama et al. |

\* cited by examiner

APPARATUS AND METHOD FOR PRODUCING A FIBER-REINFORCED INJECTION MOLDED COMPONENT

CROSS-REFERENCE TO RELATED APPLICATIONS

This application claims priority to and the benefit of German Application No. 102018201904.5, filed Feb. 7, 2018 and German Application No. 102018201903.7, filed Feb. 7, 2018. The disclosures of the above applications are incorporated herein by reference.

FIELD

The present disclosure relates to an apparatus for producing a fiber-reinforced injection molded component, in particular a vehicle component, comprising an injection mold half. The present disclosure further relates to a method for producing a fiber-reinforced injection molded component, in particular vehicle component, using a two-part injection mold.

BACKGROUND

The statements in this section merely provide background information related to the present disclosure and may not constitute prior art.

Injection molded components have a range of uses in various technical fields. In vehicle construction, for instance, injection molded parts are used, since these are generally lighter in weight than corresponding metal components. However, it may be necessary to reinforce an injection molded part in order that the injection molded component can withstand the mechanical loads during its intended usage. To this end, it is known to produce the injection molded component from an injection molding material containing reinforcing fibers. It is also known to reinforce an injection molded component locally with a reinforcing element, which, for instance, is itself produced from a fiber composite. The reinforcing element can be configured, for instance, as a fiber-reinforced plastics band. Applications are known in which a reinforcing element of this kind, during the production of an injection molded component, is oversprayed, or at least partially overmolded, with an injection molding material.

The greatest challenge in the use of a reinforcing element in the form of a fiber-reinforced plastics band, also referred to as tape, in mass production applications is given in the production process of injection molded components. The arrangement of a tape in an injection mold can here be very time-consuming. A robot or a worker must herein arrange the thin tape in the injection mold before the injection molding process can be started. This results in an ineffective production process, in particular due to the manual process actions, and the risk that the necessary positioning tolerances are not achieved. The use of a robot instead of a worker is more effective in respect of the timing and accuracy, but is more cost-intensive and requires more space.

WO 2014/076061 A1 discloses a molding tool for the injection molding of an injection-molded part with the aid of at least one fiber-free, foamed, or short-fiber-reinforced or long-fiber-reinforced plastic. The molding tool has at least two molding tool parts, which are movable relative to one another from a closing position, in which they bound a molding cavity for the injection molded part, into an opening position for the removal of the injection molded part. A boundary surface of the mold cavity in the closing position forms a negative contour of the injection molded part. There is provided a molding compound receptacle, which in the closing position of the at least two molding tools is movable in the direction of the mold cavity and which has a receiving surface, facing toward the mold cavity, that in a first position of the molding compound receptacle forms a recess for receiving a continuous-fiber-reinforced, thermoplastic plastic and, in a second position of the molding compound receptacle, forms a portion of the boundary surface of the mold cavity. The molding compound receptacle is heatable independently of the at least two molding tools.

DE 42 27 729 A1 discloses an injection molding process for producing a plastics molding, in which a stamping, made of metal, for instance, which is to be partially overmolded by the plastic is introduced into the injection mold. For the creation of the stamping, a material band is fed through the injection mold. The stamping operation in the injection mold is realized by means of a stamping punch arranged therein. With this stamping punch, the stamping is held in its correct position in the hollow mold.

U.S. Publication 2005/0258559 A1 discloses a thermoforming process and an apparatus for use in an injection molding machine for the simultaneous performance of the diverse functions of the forming, cutting and forming of deep-drawn injection molded parts. The thermoforming apparatus has a forming tool having a former assembly on one side thereof and a heating assembly on the opposite side thereof for the thermoforming of a printed substrate. The former assembly has a forming die, which is connected to a vacuum source and is accommodated in a pressure reservoir. The heating assembly contains heating elements for rapidly switching the heating of the substrate on and off, a temperature sensor for continuously monitoring the temperature of the substrate during the heating, a pressure reservoir, which is coupled to a pressure source, and a cooling vessel. The former assembly and the heating assembly come together to bring a substrate therebetween into engagement.

U.S. Pat. No. 8,128,358 B2 discloses an engine cooling fan shroud structure for a vehicle. The structure has a shell, which defines a frame. The frame has a defined wall thickness and defines an opening which is designed and arranged such that air can pass through the skirt. The shell has an engine mounting structure, which is supported in the opening and is designed and arranged for the fitting of a fan motor thereto. The frame defines passageways in order to reduce a material quantity of the shell. A layered material has a wall thickness which is substantially less than the defined wall thickness, and covers the passageways, so that air can flow mainly through the opening.

U.S. Pat. No. 6,207,090 B1 discloses a method for producing a film-covered article. A movable press having a first and a second mold surface is moved into an open position. The first mold surface has a sealing face and the second mold surface has a cutting face. A thin flexible film having a scrap portion is arranged between the first and the second mold surface. The scrap portion is positioned between the sealing and cutting faces and acts as a seal between the mold halves. The press is brought into the closed position. The cutting face touches the film and cuts the scrap portion partially along a perimeter of the film. The scrap portion remains between the cutting and the sealing face and seals the space between the first and the second mold face.

Johnston et al. disclose an automated production of high-performance composite bodies (Automated Fabrication of High Performance Composites: An Overview of Research at the Langley Research Center, Johnston et al., NASA Langley Research Center, Doc. ID 20040110403, Jan. 1, 1997).

SUMMARY

The present disclosure improves the production of an at least partially fiber-reinforced injection molded component, in particular in terms of a reduction in its production costs.

In one form of the present disclosure, an apparatus for improving the production of an at least partially fiber-reinforced injection molded component includes: at least one receiving chamber; at least one feed channel; at least one feed device; at least one first clamping device; at least one second clamping device; at least one first cut-through device; and at least one second cut-through device. The at least one receiving chamber is arranged on an injection mold half and configured partially open to a cavity part of the injection mold half and the at least one feed channel is arranged on the injection mold half and opens out into the receiving chamber such that the receiving chamber is communicatingly connected to a surroundings of the injection mold half. The at least one feed device feeds a band section of a fiber-reinforced plastics band from outside the injection mold half, via the feed channel, into the receiving chamber. Also, the at least one first clamping device is arranged in an initial region of the receiving chamber and the at least one second clamping device, arranged in an end region of the receiving chamber such that the band section fed into the receiving chamber can be clamped in certain areas. The initial region of the receiving chamber, when viewed in the longitudinal direction, is arranged at a closer distance to the feed channel relative to the end region, and the end region is arranged at a further distance from the feed channel relative to the initial region.

In some aspects of the present disclosure, the at least one first cut-through device is arranged in the initial region and at least one second cut-through device is arranged in the end region. In such aspects, the at least one first and second cut-through devices are arranged in front of and behind the clamping devices such that an intermediate portion of the band section located between the clamping devices can be separated from the rest of the band section.

According to the present disclosure, the intermediate portion of the band section of the fiber-reinforced plastics band forms a part of the injection molded part and can be fed into the receiving chamber prior to the performance of the injection molding by the feed device in an automated and positionally accurate manner. Accordingly, no manual manipulations of the plastics band are necessary, which improves the accuracy, the rapidity and the reproducibility of the positioning of the intermediate portion in the receiving chamber.

After the band section has been fed by the feed device in an automated manner into the receiving chamber, the band section is clamped by the clamping devices and is held securely. Through the clamping of the band section the closed injection mold is sealed in order to enable the performance of a subsequent injection molding process. That is, after the clamping of the band section, the injection mold can be closed and the injection molding commenced.

Prior to the injection molding, the cut-through devices can separate the intermediate portion from the band section. After the injection molding, the clamping devices can be opened or the clamping of the remaining end portions of the band section undone, such that the injection molded component with the intermediate band portion can be removed from the opened injection mold without delay. Once the injection molded part has been removed from the opened injection mold, a further production process can take place, which again commences with the automated feeding of a further band section of the fiber-reinforced plastics band into the receiving chamber.

According to the present disclosure, the feed device, the clamping devices and the cut-through devices, together with the injection mold half, are combined to form a sub-assembly that can be structurally integrated in the injection mold half. This sub-assembly can be used in new injection molding machines and, within an upgrade, also in pre-existing injection molding machines. Thus, for the introduction of a fiber reinforcement element into the injection mold half, no additional machines, robots or manual manipulation steps are necessary.

The fiber-reinforced plastics band (also referred to herein simply as "plastics band") can be configured as a flat band having reinforcing fibers oriented, in the band longitudinal direction, unidirectionally, bidirectionally or multidirectionally. The plastics band can be made up of two or more layers having different fiber orientations. The plastics band can have a polymer material, in which the reinforcing fibers are at least partially embedded. In some aspects of the present disclosure, the polymer material has a melting temperature similar or identical to the plastics component of the injection molding material such that the polymer material bond integrally with the plastics component of the injection molding material during injection molding. As a result, a detachment of the intermediate portion of the band section from the rest of the injection molded component can be reliably prevented. The reinforcing fibers of the plastics band can be, for instance, glass fibers, carbon fibers, aramid fibers, or other artificial or natural fibers.

In some aspects of the present disclosure, the receiving chamber elongated shape when viewed in the band longitudinal direction and is arranged in such a way on the injection mold half. Also, the receiving chamber is configured partially open to the cavity part of the injection mold half such that the intermediate portion of the band section can be arranged at a desired position of the injection molded component. In such aspects, the receiving chamber is of cuboid configuration (shape) and partially or fully receives the clamping devices and the cut-through devices. The feed channel is arranged on the injection mold half, opens out into the receiving chamber and is adapted to the cross-sectional area of the plastics band or configured correspondingly flat, in order to be able to feed the plastics band or its end band section to the receiving chamber securely and without distortions.

The feed device can have a replenishable storage unit for storing the fiber-reinforced plastics band, in order to be able to consecutively feed to the receiving chamber, within a successive production of same injection molded components, the required band sections. The feed device further has at least one electrically controllable drive device, with which the plastics band can be moved section by section from the storage unit to the receiving chamber. The storage unit or the feed device can be designed to emit a signal whenever the plastics band quantity still available in the storage unit falls below a predefined limit value.

Each clamping device can have at least one clamping element, with which a portion of the band section fed into the receiving chamber can be pressed against a further part of the clamping device or an inner wall of the receiving chamber, and thereby clamped. Each clamping device can further have an electrically controllable drive for driving the respective clamping element. Alternatively, the clamping elements of the clamping devices can be actuated via a common drive.

Each cut-through device can have at least one cut-through element, for instance a blade, with which the band section fed into the receiving chamber can be cut through. Each cut-through device can further have an electrically controllable drive for driving the respective cut-through element. Alternatively, the cut-through elements of the cut-through devices can be actuated via a common drive. The cut-through devices are arranged, with respect to the band longitudinal direction, in front of and behind the clamping devices.

The clamping device and the cut-through device in the initial region of the receiving chamber can be realized by a single clamping and cut-through device. The clamping device and the cut-through device in the end region of the receiving chamber can also be realized by a single clamping and cut-through device. The respective clamping element of the respective clamping and cut-through device can here also be used as a cut-through element of this clamping and cut-through device. Alternatively, the clamping element and the cut-through element of the respective clamping and cut-through device are separate components.

The apparatus according to the teachings of the present disclosure can in particular be used to produce an at least partially fiber-reinforced injection molded component in the form of a vehicle component. To this end, the apparatus can have a further injection mold half, which is conventionally configured and which, for closure of the injection mold, can be connected to the injection mold. Alternatively, both injection mold halves of the injection mold can be designed according to the teachings of the present disclosure. Within the context of the present disclosure, the term "injection mold half" should not be construed to mean that the injection mold half actually exactly or approximately represents a physical half of the injection mold. Instead, the injection mold half can markedly differ in its dimensions from the exact physical half of the injection mold.

According to one form of the present disclosure, the feed device has at least one mounting arranged on the outside of the injection mold half, and at least one unwindable plastics band coil arranged exchangeably on the mounting. The plastics band coil serves as a storage unit for the plastics band. The plastics band coil is arranged on the mounting by a portion of the mounting being fed through a central axial opening in the plastics band coil. If a new plastics band coil is arranged on the mounting, the free band section of the plastics band can firstly be fed manually into the feed channel. This step is necessary only if a new plastics band coil is arranged on the mounting. After this, the successive automated feeding of the band sections into the receiving chamber can take place.

According to another form of the present disclosure, the feed device has at least one electrically controllable drive for unwinding the plastics band coil. For the controlling of the drive, separate control electronics or appropriately programmed electronics of an injection molding machine can be used. The drive is preferably an electric motor, with which the plastics band coil can be rotated about its longitudinal center axis.

In some aspects of the present disclosure, the at least one receiving chamber comprises at least two receiving chambers separated from each other and each receiving chamber is open to the cavity part of the injection mold half. In such aspects, the at least one feed channel comprises at least two feed channels and each of the at least two feed channels is communicatingly connected with one of the at least two receiving chambers such that each of the at least two receiving chambers are communicatingly connected to the surroundings of the injection mold half. Also, the at least one feed device comprises a stationary coupling unit configured to arbitrarily connect to each of the at least two feed channels. The at least one first clamping device comprises at least two first clamping devices such that a first clamping device is arranged in the initial region of each of the at least two receiving chambers and the at least one second clamping device comprises at least two second clamping devices such that a second clamping device is arranged in an end region of each of the receiving chambers. Each of the first clamping devices and each of the second clamping devices are configured to clamp a band section fed into a given receiving chamber. The at least one first cut-through device comprises at least two first cut-through devices such that a first cut-through device is arranged in the initial region of each of the at least two receiving chambers and the at least one a second cut-through device comprises at least two second cut-through devices such that a second cut-through device is arranged in the end region of each of the receiving chambers. Each of the first cut-through devices and each of the second cut-through devices are configured to cut and separate an intermediate portion of the band section located between the respective first and second clamping devices from the band section fed into a given receiving chamber.

According to another form of the present disclosure a method for improving the production of an at least partially fiber-reinforced injection molded component includes, prior to an injection of an injection molding material into a cavity of a closed injection mold, feeding a band section of a fiber-reinforced plastics band from outside the injection mold in an automated manner into a receiving chamber on an injection mold half. The receiving chamber is configured partially open to a cavity part of the injection mold half and the band section fed into the receiving chamber is clamped in an automated manner at least two clamping points arranged at a distance apart in the longitudinal direction of the band section. An intermediate portion of the band section located between the clamping points is separated in an automated manner from the rest of the band section prior to or during the injection of the injection molding material into the closed injection mold.

The advantages which have been stated above with regard to the apparatus are correspondingly associated with the method. In particular, the method can be implemented with the apparatus according to one of the above-stated forms, or a mutual combination of at least two of these forms.

Regarding the injection molding material, a material with or without reinforcing fibers or with or without any other filling material, such as, for instance, talc, can be used. Non-limiting examples include polypropylene, a polyamide, polyoxymethylene, a polycarbonate or an acrylonitrile-butadiene-styrene copolymer, and the like. Regarding fiber reinforcement of the material, short of long fibers can be used. Non-limiting examples include glass fibers, carbon fibers, aramid fibers or other artificial or natural fibers, and the like. The injection molding material can be foamed, moreover, by a physical or chemical foaming process, in order to reduce the weight of the injection molded component.

According to an advantageous form of the present disclosure, the plastics band, for feeding into the receiving chamber, is unwound in an automated manner from a plastics band coil arranged outside the injection mold. With this form should be correspondingly associated the advantages which have been stated above with regard to the corresponding form of the apparatus.

It should be pointed out that the features and measures which are individually cited in the following description can be mutually combined in any technically sensible manner and demonstrate further forms of the present disclosure. The description additionally characterizes and specifies the present disclosure, in particular in association with the figures.

Further areas of applicability will become apparent from the description provided herein. It should be understood that the description and specific examples are intended for purposes of illustration only and are not intended to limit the scope of the present disclosure.

DRAWINGS

Figure 2:
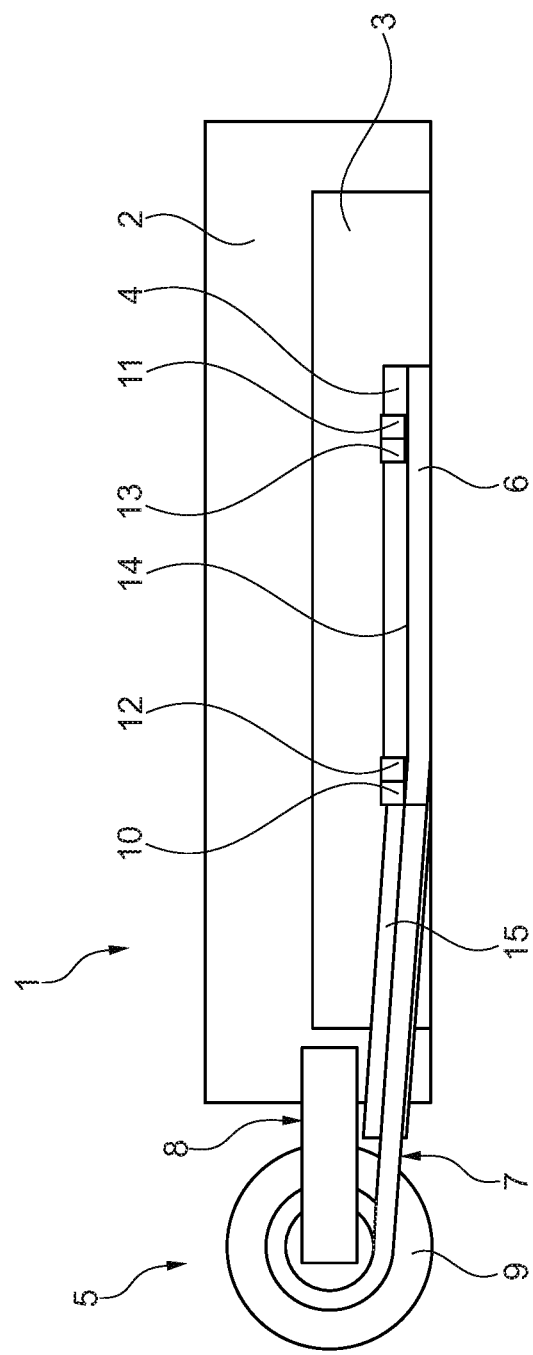
Figure 3:
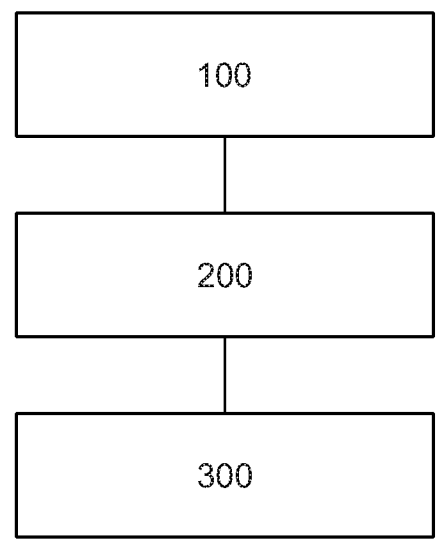
Figure 4:
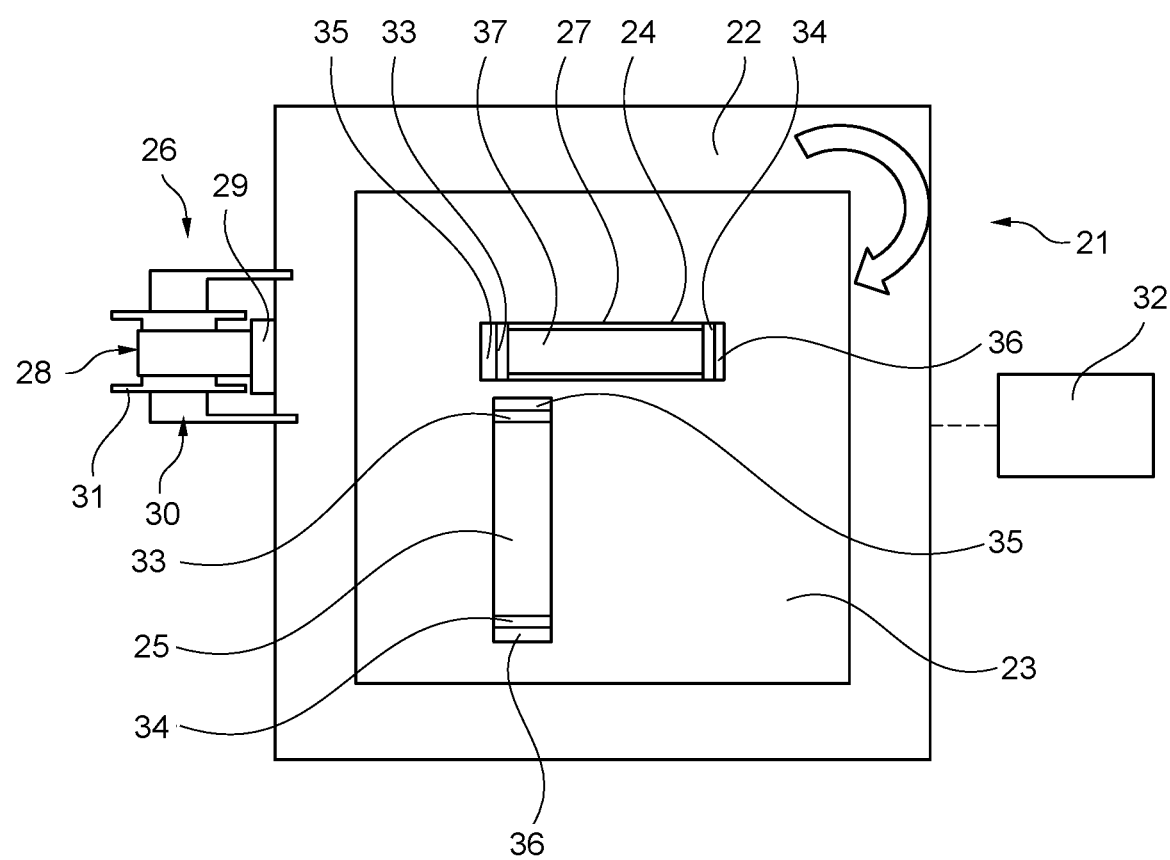
Figure 5:
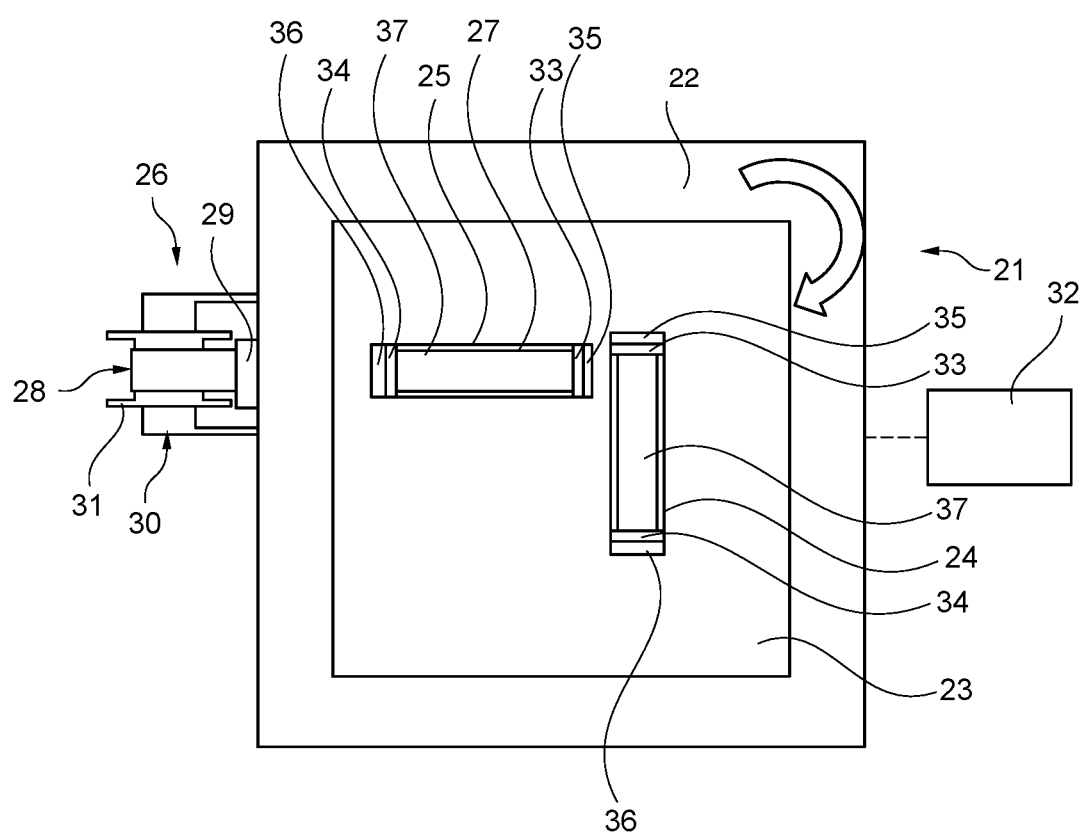
Figure 6:
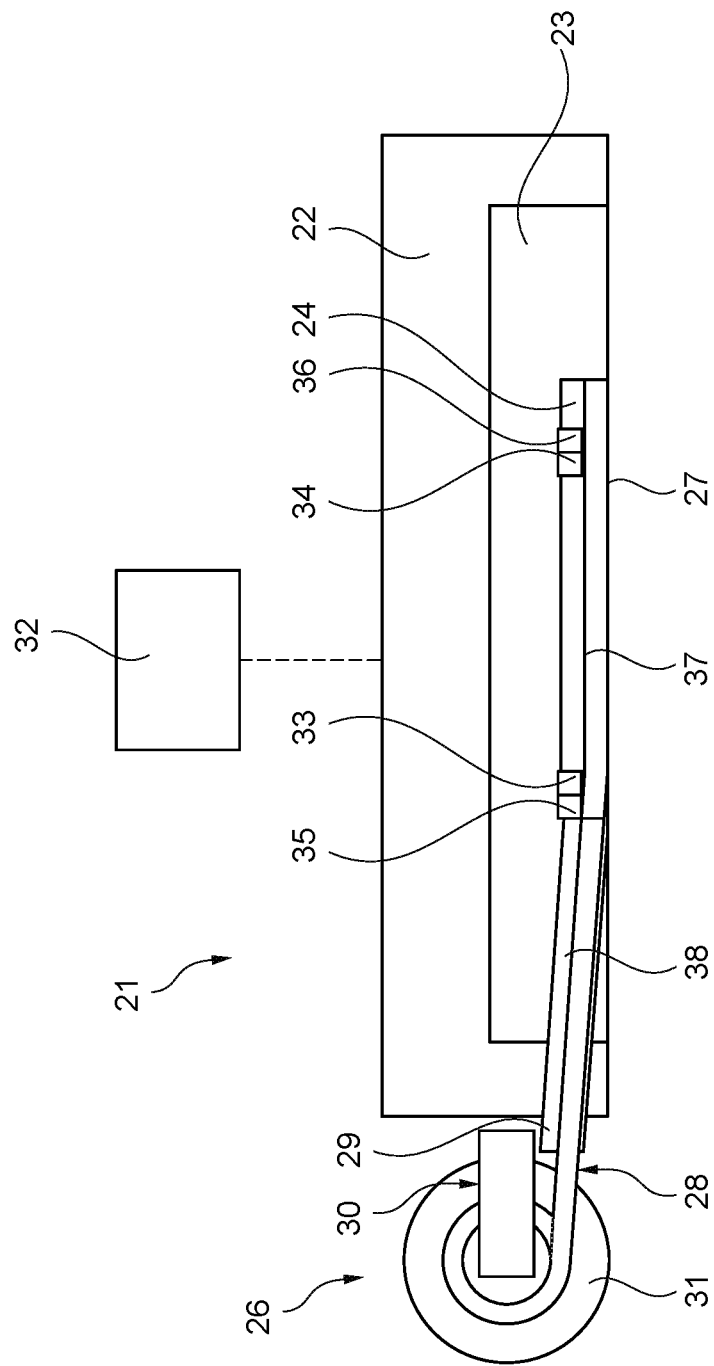
Figure 7:
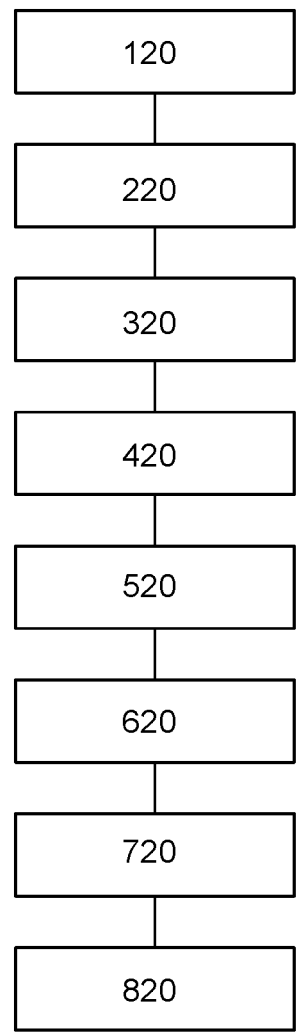

In order that the disclosure may be well understood, there will now be described various forms thereof, given by way of example, reference being made to the accompanying drawings, in which:

FIG. 1 shows a schematic representation of an illustrative form of an apparatus according to the teachings of the present disclosure, FIG. 2 shows a schematic sectional representation of the apparatus shown in FIG. 1, FIG. 3 shows a flow chart of an illustrative form of a method according to the teachings of the present disclosure, FIG. 4 shows a schematic representation of an illustrative form of an apparatus in a first state according to the teachings of the present disclosure, FIG. 5 shows a schematic representation of the apparatus in FIG. 4 in a second state, FIG. 6 shows a schematic side sectional representation of the apparatus in FIG. 4, and FIG. 7 shows a flow chart of an illustrative form of a method according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic representation of an illustrative form of an apparatus 1 according to the teachings of the present disclosure for producing an at least partially fiber-reinforced injection molded component (not shown), i.e., an injection molded component that is at least partially fiber reinforced. The apparatus 1 has at least one injection mold half 2.

The apparatus 1 has a receiving chamber 4, which is arranged on the injection mold half 2 and is configured partially open to a cavity part 3 of the injection mold half 2. In FIG. 1, the open side of the receiving chamber 4 is shown. The receiving chamber 4 is, by way of example, of cuboid configuration and extends over a part of the shown longitudinal extent of the injection mold half 2.

The apparatus 1 further has a feed channel (shown in FIG. 2), which is arranged on the injection mold half 2 and opens out into the receiving chamber 4 and via which the receiving chamber 4 is communicatingly connected to a surroundings of the injection mold half 2.

Moreover, the apparatus 1 has a feed device 5 for feeding a band section 6 of a fiber-reinforced plastics band 7 from outside (i.e., the surroundings) the injection mold half 2, via the feed channel 15, into the receiving chamber 4. The feed device 5 has a mounting 8 (i.e., a mount) arranged on the outside of the injection mold half 2, and an unwindable plastics band coil 9 (i.e., a plastics band coil that can be unwound) arranged exchangeably on the mounting 8. Moreover, the feed device 5 has an electrically controllable drive (not shown) for unwinding the plastics band coil 9. In FIG. 1, a part of the plastics band 7 is unwound from the plastics band coil 9, so that the band section 6 is fed into the receiving chamber 4.

The apparatus 1 has a first clamping device 12, arranged in an initial region of the receiving chamber 4. The initial region, viewed in the longitudinal direction, is arranged closer to the feed channel 15 (FIG. 2) of the feed device 5, and a second clamping device 13 arranged in an end region of the receiving chamber 4. The end region, related to the initial region, is arranged further distant from the feed channel. The band section 6 fed into the receiving chamber 4 can in certain areas be clamped be clamped by the first and second clamping devices 12, 13.

In addition, the apparatus 1 has a first cut-through device 10, arranged in the initial region, and a second cut-through device 11, arranged in the end region. The first and second cut-through devices 10, 11 are arranged respectively in front of and behind the clamping devices 12 and 13 and can separate an intermediate portion 14 of the band section 6 located between the first and second clamping devices 12, 13 from the rest of the band section 6. The clamping device 12 and the cut-through device 10 can be mutually combined to form a single clamping and cut-through device (not shown). The clamping device 13 and the cut-through device 11 can be mutually combined to form a single clamping and cut-through device (not shown).

FIG. 2 shows a schematic side sectional representation of the apparatus 1 shown in FIG. 1. In particular, the feed channel 15 arranged on the injection mold half 2 is shown. The plastics band 7 runs through the feed channel 15 and the feed channel 15 opens out into the receiving chamber 4. The feed channel 15 is positioned obliquely in relation to the horizontal and runs, in the drawing plane of FIG. 2, at an angle from top to bottom of the injection mold half 2 as viewed in FIG. 2.

FIG. 3 shows a flow diagram of an illustrative form of a method according to the teachings of the present disclosure for producing an at least partially fiber-reinforced injection molded component, using an at least two-part injection mold.

In method step 100, prior to an injection of an injection molding material into a cavity of the closed injection mold (i.e., an injection mold cavity), a band section of a fiber-reinforced plastics band is fed from outside the opened injection mold in an automated manner into a receiving chamber on an injection mold half, wherein the receiving chamber is configured partially open to a cavity part of the injection mold half. The plastics band can herein, for feeding into the receiving chamber, be unwound in an automated manner from a plastics band coil arranged outside the injection mold.

In method step 200, the band section fed into the receiving chamber is clamped in an automated manner at at least two clamping points, which are arranged at a distance apart in the longitudinal direction of the band section.

In method step 300, the injection mold is firstly closed and, after this, an intermediate portion of the band section, located between the clamping points, prior to the injection of the injection molding material into the closed injection mold, is separated in an automated manner from the rest of the band section.

Referring now to FIGS. 4-6, schematic representations of an another form of an apparatus 21 for producing an at least partly fiber-reinforced injection molded component (not shown) according to the teachings of the present disclosure is shown in which like elements as shown in FIGS. 1 and 2 are indexed by 20. The apparatus 21 shown in FIG. 4 is in a first state and comprises at least one injection mold half 22.

The apparatus 21 comprises two receiving chambers 24 and 25, arranged on the injection mold half 22, separate from each other, and designed to be partly open toward a cavity portion 23 of the injection mold half 22. In FIG. 4, the open side of each receiving chamber 24 and 25 is shown. Each receiving chamber 24 and 25 is fashioned as a cuboid and extends along a portion of the indicated longitudinal extension of the injection mold half 22. In some aspects of the present disclosure, the receiving chambers 24 and 25 run perpendicular to each other.

Furthermore, the apparatus 21 comprises two feeding channels, not shown in FIG. 4, arranged on or within the injection mold half 22 and each leading to its own one of the receiving chambers 24 and 25, and by which the receiving chambers 24 and 25 are connected in communication with the surroundings of the injection mold half 22. A feeding channel 18 leading to the receiving chamber 24 is shown in FIG. 6.

Furthermore, the apparatus 21 comprises a feeding mechanism 26 for introducing a band segment 27 of a fiber-reinforced plastic band 28 from outside the injection mold half 22 via the respective feeding channel into the respective receiving chamber 24 or 25. For example, while in the position shown in FIG. 4, the feeding mechanism 26 feeds one band segment 27 into the receiving chamber 24. The feeding mechanism 26 comprises a stationary coupling unit 29 which can be arbitrarily connected to one of the feeding channels. The coupling unit 29 comprises at least one clamp, not shown, for the clamping of a plastic band segment, not shown, located in the coupling unit 29.

The feeding mechanism 26 comprises a stationary holding unit (i.e., a mount) 30, connected to the coupling unit 29, and an unwindable plastic band reel 31 interchangeably arranged on the holding unit 20. Furthermore, the feeding mechanism 26 comprises an electrically controllable drive, not shown, for the unwinding of the plastic band reel 31. In FIG. 4, a portion of the plastic band 28 has been unwound from the plastic band reel 31, so that the band segment 27 has been introduced into the receiving chamber 24.

The apparatus 21 furthermore comprises a schematically indicated movement mechanism 32 for moving the injection mold half 22 relative to the coupling unit 29 so that the coupling unit 29 can be connected arbitrarily to one of the feeding channels, as will be clear from a joint consideration of FIGS. 4 and 5.

Furthermore, the apparatus 21 comprises, for each receiving chamber 24 or 25, a first clamping mechanism 33 situated in an initial region of the respective receiving chamber 24 or 25 closer to the respective feeding channel and a second clamping mechanism 34 situated in an end region of the respective receiving chamber 24 or 25 further away from the respective feeding channel. The band segment 27 introduced into the respective receiving chamber 24 or 25 can be clamped in portions by the first clamping mechanism 33 and second clamping mechanism 34 situated in each of the respective receiving chamber 24, 25.

Moreover, the apparatus 21 comprises, for each receiving chamber 24 or 25, a first cut-through device 35 situated in the respective initial region of each receiving chamber 24 or 25 and a second cut-through device 36 situated in the respective end region of each receiving chamber 24 or 25, between which the respective clamping mechanisms 33 and 34 are arranged. Also, an intermediate portion 37 of the respective band segment 27 located between the first cut-through device 35 and the second cut-through device 36 can be severed from the rest of the band segment 27. The first clamping mechanism 33 and the first cut-through device 35 of the respective receiving chamber 24 or 25 may be combined with each other to form a single clamping and separating mechanism, not shown. In the alternative, or in addition to, the second clamping mechanism 34 and the second cut-through device 36 of the respective receiving chamber 24 or 25 may also be combined with each other to form a single clamping and separating mechanism, not shown.

FIG. 5 shows a schematic representation of the device 21 shown in FIG. 4 in a second state. The second state starts from the first state shown in FIG. 4, in that the injection mold half 22 has been turned clockwise by 90° about an axis of rotation, not shown, running perpendicular to the plane of the drawing, as compared to the position of the injection mold half 22 indicated in FIG. 4. For this, the feeding mechanism 26 may be temporarily moved away from the injection mold half 22, in order to provide sufficient space for the rotary movement of the injection mold half 22. In the second state of the device 21, the coupling unit 29 is connected to the feeding channel, not shown, leading to the receiving chamber 25 while a band segment 27 of the plastic band 28 has also been introduced into the receiving chamber 25 by means of the feeding mechanism 26.

FIG. 6 shows a schematic side sectional representation of the device 21 shown in FIG. 4. In particular, the feeding channel 38 arranged on the injection mold half 22 is shown, through which the plastic band 28 runs and which leads to the receiving chamber 24.

FIG. 7 shows a flow chart of an exemplary form of a method according to the present disclosure for producing an at least partly fiber-reinforced injection molded component making use of an at least two-part injection mold.

In method step 120, before the injecting of an injecting molding material into a cavity of the injection mold, a band segment of a fiber-reinforced plastic band is introduced from outside the injection mold automatically into a receiving chamber on an injection mold half, wherein the receiving chamber is designed partly open toward a cavity portion of the injection mold half. The plastic band may be automatically unwound from a plastic band reel situated outside the injection mold for the introducing into the receiving chamber.

In method step 220, the band segment introduced into the receiving chamber is automatically clamped at least at two clamping sites arranged at a spacing from each other in the longitudinal direction of the band segment.

In method step 320, the clamped band segment is automatically severed from the plastic band.

In method step 420, a position of the injection mold half in space is changed.

In method step 520, a further band segment of the fiber-reinforced plastic band is introduced from outside the injection mold automatically into a further (another) receiving chamber on the injection mold half, the other receiving chamber being designed partly open toward the cavity portion of the injection mold half.

In method step 620, the further band segment introduced into the further receiving chamber is automatically clamped at least at two further clamping sites arranged at a spacing from each other in the longitudinal direction of the band segment.

In method step 720, the clamped further band segment is automatically severed from the plastic band.

In method step 820, an injection mold comprising the injection mold half is closed and then an injection molding is performed.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for producing a fiber-reinforced injection molded component comprising:
   an injection mold half with a cavity part and at least one receiving chamber partially open to the cavity part;
   at least one feed channel extending through a wall of the injection mold half and open to the at least one receiving chamber and communicatingly connected to a surroundings of the injection mold half;
   at least one feed device for feeding a band section of a fiber-reinforced plastics band from outside the injection mold half into the at least one receiving chamber via the feed channel;
   at least one first clamping device arranged in an initial region of the receiving chamber arranged closer to the feed channel and at least one second clamping device arranged in an end region of the receiving chamber at a further distant from the feed channel than the at least one first clamping device, wherein the at least one first and second clamping devices are configured to clamp the band section fed into the receiving chamber; and
   at least one first cut-through device arranged in the initial region and at least one second cut-through device arranged in the end region, wherein the at least one first and second cut-through devices are configured to cut and separate an intermediate portion of the band section located between the first and second clamping devices from the band section fed into the receiving chamber.

2. The apparatus according to claim 1, wherein the feed device has at least one mount arranged on the outside of the injection mold half and at least one unwindable plastics band coil arranged exchangeably on the mount.

3. The apparatus according to claim 2, wherein the feed device has at least one electrically controllable drive for unwinding the plastics band coil.

4. The apparatus according to claim 1, wherein the at least one receiving chamber partially open to the cavity part of the injection mold half comprises a first receiving chamber partially open to the cavity part of the injection mold half and a second receiving chamber partially open to the cavity part of the injection mold half.

5. The apparatus according to claim 4, wherein the at least one feed channel comprises a first feed channel open to the first receiving chamber and communicatingly connected to a surroundings of the injection mold half and a second feed channel open to the second receiving chamber and communicatingly connected to a surroundings of the injection mold half.

6. The apparatus according to claim 5, wherein the at least one first clamping device comprises a first clamping device arranged in an initial region of the first receiving chamber, a second clamping device arranged in an end region of the first receiving chamber, another first clamping device arranged in an initial region of the second receiving chamber, and another second clamping device arranged in an end region of the second receiving chamber.

7. The apparatus according to claim 6, wherein the at least one first cut-through device comprises a first cut-through device arranged in the initial region of the first receiving chamber and another first cut-through device arranged in the initial region of the second receiving chamber, and the at least one second cut-through device comprises a second cut-through device arranged in the end region of the first receiving chamber and another second cut-through device arranged in the end region of the second receiving chamber.

8. The apparatus according to claim 7, wherein the injection mold half is configured to rotate such that the at least one feeding device is connected to the first feed channel in a first state and connected to the second feed channel in a second state.

9. An apparatus for producing a fiber-reinforced injection molded component comprising:
   an injection mold half with a first receiving chamber partially open to a cavity part of the injection mold half and a second receiving chamber partially open to the cavity part of the injection mold half;
   a first feed channel open to the first receiving chamber and communicatingly connected to a surroundings of the injection mold half and a second feed channel open to the second receiving chamber and communicatingly connected to a surroundings of the injection mold half;
   at least one feed device for feeding a first band section of a fiber-reinforced plastics band from outside the injection mold half into the first receiving chamber via the first feed channel and a second band section of the fiber-reinforced plastics band into the second receiving chamber via the second feed channel;
   a first clamping device arranged in an initial region of the first receiving chamber arranged closer to the first feed channel, a second clamping device arranged in an end region of the first receiving chamber at a further distant from the first feed channel than the first clamping device, another first clamping device arranged in an initial region of the second receiving chamber arranged closer to the second feed channel, another second clamping device arranged in an end region of the second receiving chamber at a further distant from the first feed channel than the first clamping device, wherein the first clamping device and the second clamping device are configured to clamp the first band section fed into the first receiving chamber and the another first clamping device and the another second clamping device are configured to clamp the second band section fed into the second receiving chamber; and
   a first cut-through device arranged in the initial region of the first receiving chamber, a second cut-through device arranged in the end region of the first receiving chamber, another first cut-through device arranged in the initial region of the second receiving chamber, and another second cut-through device arranged in the end region of the second receiving chamber, wherein the first and second cut-through devices are configured to cut and separate an intermediate portion of the first band section located between the first and second clamping devices from the first band section fed into the first receiving chamber, and the another first and another second cut-through devices are configured to cut and separate an intermediate portion of the second band section located between the another first and another second clamping devices from the second band section fed into the second receiving chamber, wherein the injection mold half is configured to rotate such that the at least one feed device is connected to the first feed channel in a first state and connected to the second feed channel in a second state.

10. The apparatus according to claim 9, wherein the at least one feed device has at least one mount arranged on the outside of the injection mold half and at least one unwindable plastics band coil arranged exchangeably on the mount.

11. The apparatus according to claim 10, wherein the at least one feed device has at least one electrically controllable drive for unwinding the plastics band coil.

\* \* \* \* \*